(12) United States Patent
Hadar et al.

(10) Patent No.: US 9,400,637 B1
(45) Date of Patent: Jul. 26, 2016

(54) SOLUTION MODELING AND ANALYSIS TOOLSET FOR ENTERPRISE SOFTWARE ARCHITECTURE

(71) Applicant: CA, Inc., Islandia, NY (US)

(72) Inventors: Eitan Hadar, Nesher (IL); Irit Hadar, Nesher (IL); Jason Davis, Bristol (GB)

(73) Assignee: CA, Inc., Islanida, NY (US)

( * ) Notice: Subject to any disclaimer, the term of this patent is extended or adjusted under 35 U.S.C. 154(b) by 236 days.

(21) Appl. No.: 13/798,929

(22) Filed: Mar. 13, 2013

(51) Int. Cl.
*G06F 9/45* (2006.01)
*G06F 9/44* (2006.01)

(52) U.S. Cl.
CPC ........................................ *G06F 8/10* (2013.01)

(58) Field of Classification Search
None
See application file for complete search history.

(56) References Cited

U.S. PATENT DOCUMENTS

| | | | |
|---|---|---|---|
| 7,334,216 B2 * | 2/2008 | Molina-Moreno et al. ... | 717/109 |
| 7,904,320 B1 | 3/2011 | Adams et al. | |
| 7,996,347 B2 | 8/2011 | Hutson et al. | |
| 8,176,472 B2 | 5/2012 | Kim | |
| 8,255,829 B1 | 8/2012 | McCormick et al. | |
| 2003/0074648 A1 | 4/2003 | Brassard et al. | |
| 2004/0060776 A1 | 4/2004 | Tyni et al. | |
| 2007/0061776 A1 | 3/2007 | Ryan et al. | |
| 2007/0245297 A1 | 10/2007 | Kuester et al. | |
| 2007/0288275 A1 | 12/2007 | Kumar | |
| 2008/0140472 A1 | 6/2008 | Gilat et al. | |
| 2009/0235225 A1 | 9/2009 | Killisperger et al. | |
| 2009/0299797 A1 | 12/2009 | Kaczmarek et al. | |
| 2010/0023360 A1 | 1/2010 | Nadhan | |
| 2011/0191132 A1 | 8/2011 | Westcott et al. | |
| 2012/0124104 A1 | 5/2012 | Bhandari et al. | |
| 2012/0210292 A1 | 8/2012 | Zhang et al. | |

OTHER PUBLICATIONS

Alizadeh, Shirin S.; Final Office Action; U.S. Appl. No. 13/799,046; Feb. 13, 2015; United States Patent and Trademark Office; Alexandria, VA.
Luu, Cuong V.; Final Office Action; U.S. Appl. No. 13/798,768; Apr. 6, 2015; United States Patent and Trademark Office; Alexandria, VA.
Luu,Cuong V; Notice of Allowance; U.S. Appl. No. 13/798,768; Jul. 22, 2015; United States Patent and Trademark Office; Alexandria, Virginia.
Kaj Storbacka; A Solution Business Model: Capabilities and management practices for integrated solutions; 2011 ScienceDirect; pp. 699-711; <http://www.sciencedirect.com/science/article/pii/S0019852111000551#>.
David F. Feeny et al.; Core IS Capabilities for Exploiting Information Technology; Sloan Management Review; Spring 1998, pp. 9-21; <http://www.umsl.edu/~lacitym/coreIS.pdf>.

(Continued)

*Primary Examiner* — Chuck Kendall
(74) *Attorney, Agent, or Firm* — Stevens & Showalter LLP

(57) ABSTRACT

Modeling an enterprise architecture includes associating a plurality of desired business capabilities with a plurality of requirements and associating each of a plurality of technology components with one or more of the plurality of requirements, based on a respective technology supporting the one or more requirements. Then a model may be constructed that includes linking each of the technology components with one or more of the desired business capabilities based on the associating of the plurality of desired business capabilities with the plurality of requirements and the associating of each of the plurality of technology components with one or more of the plurality of requirements.

24 Claims, 6 Drawing Sheets

(56) References Cited

OTHER PUBLICATIONS

Diep Dao et al.; Location-based services: technical and business issues; Published online Nov. 12, 2002; Springer-Verlag; pp. 169-178; <http://link.springer.com/article/10.1007/s10291-02-0031-5>.

David Chen et al.; European initiatives to develop interoperability of enterprise applications-based concepts, framework and roadmap; 2003 Pergamon; pp. 153-154; <http://www.sciencedirect.com/science/article/pii/S1367578803000257#>.

Harry H. M. Hendrickx et al.; Defining the Business Architecture Profession; 2011 IEEE; pp. 325-332; <http://ieeexplore.ieee.org/stamp/stamp.jsp?tp=&arnumber=6046995>.

Claudia Hess et al.; Business Building Blocks as Coordination Mechanism for Enterprise Transformations; 2013 IEEE; pp. 194-203; <http://ieee.org/stamp/stamp.jsp?tp=&arnumber=6690552>.

Alizadeh, Shirin S.; Notice of Allowance; U.S. Appl. No. 13/799,046; dated Sep. 25, 2015; United States Patent and Trademark Office; Alexandria, Virginia.

Alizadeh, Shirin S.; Non-Final Office Action; U.S. Appl. No. 13/799,046; Oct. 6, 2014; United States Patent and Trademark Office; Alexandria, VA.

Luu, Cuong V.; Non-Final Office Action; U.S. Appl. No. 13/798,768; Dec. 8, 2014; United States Patent and Trademark Office; Alexandria, VA.

\* cited by examiner

SOLUTION MODELING AND ANALYSIS TOOLSET FOR ENTERPRISE SOFTWARE ARCHITECTURE

This application is being filed concurrently with U.S. Ser. No. 13/798,768, entitled SOLUTION MODELING AND ANALYSIS TOOLSET FOR ENTERPRISE SOFTWARE ARCHITECTURE AND ARCHITECTURE ROADMAPS, by Hadar et al., and U.S. Ser. No. 13/799,049, entitled SOLUTION MODELING AND ANALYSIS TOOLSET FOR ENTERPRISE SOFTWARE ARCHITECTURE AND SKELETON ARCHITECTURE, by Hadar et al., the entire disclosures of which are incorporated by reference herein.

BACKGROUND

The present disclosure relates to managing an enterprise architecture, and more specifically, to modeling and analyzing the architecture.

Current Enterprise Architecture Management Frameworks such as TOGAF and Zachman cater to information technology (IT) managers (e.g., a Chief Information Officer (CIO)) who need to provide an IT solution to meet their business needs. However, when a CIO attempts to select off-the-shelf technology (e.g., software, hardware, or composite solution), they encounter difficulty matching offered capabilities of the technology with their business needs. One reason for this difficulty is a lack of traceability of offered capabilities to needs and traceability of requirements to technology.

There are some software architecture modeling tools that focus on producing software applications that satisfy some of an Enterprise's business needs, e.g., a Business Architecture. But even with such tools, a Service Engineer or Implementation Engineer typically manually constructs a specific solution according to an existing business architecture. The level of abstraction for a Business Architecture produces a different language (i.e., different terminology) and different artifacts as compared to a software design (or modeling) language and its artifacts. Furthermore, the terminology and artifacts of an implementation solution differ as well. Thus, there are three different domains, or abstraction levels, that have three different modeling environments and nomenclature. Because users in each of the three domains employ their own tools, it is difficult without intensive human interpretation and labor to decide which capability is implemented in which technology and the order that such an implementation should be accomplished. In other words, transforming business goals into an architecture roadmap for a solution is difficult.

BRIEF SUMMARY

According to one aspect of the present disclosure, a method for modeling an enterprise architecture includes associating, by the computer, a plurality of desired business capabilities with a plurality of requirements; and associating, by the computer, each of a plurality of technology components with one or more of the plurality of requirements, based on a respective technology supporting the one or more requirements. The method also includes constructing, by the computer, a model of the enterprise architecture, said constructing comprising linking each of the technology components with one or more of the desired business capabilities based on the associating of the plurality of desired business capabilities with the plurality of requirements and the associating of each of the plurality of technology components with one or more of the plurality of requirements.

According to another aspect of the disclosure, a computer program product for modeling an enterprise architecture includes a computer readable storage medium having computer readable program code embodied therewith. This computer readable program code includes computer readable program code configured to associate a plurality of desired business capabilities with a plurality of requirements; and computer readable program code configured to associate each of a plurality of technology components with one or more of the plurality of requirements, based on a respective technology supporting the one or more requirements. The computer readable program code also includes computer readable program code configured to construct a model of the enterprise architecture, said constructing comprising linking each of the technology components with one or more of the desired business capabilities based on the associating of the plurality of desired business capabilities with the plurality of requirements and the associating of each of the plurality of technology components with one or more of the plurality of requirements.

According to another aspect of the disclosure, a system for modeling an enterprise architecture includes a processor and a memory coupled to the processor, the memory configured to store program code executable by the processor. The program code includes program code configured, when executed by the processor, to associate a plurality of desired business capabilities with a plurality of requirements; and program code configured, when executed by the processor, to associate each of a plurality of technology components with one or more of the plurality of requirements, based on a respective technology supporting the one or more requirements. The program code also includes program code configured, when executed by the processor, to construct a model of the enterprise architecture, said constructing comprising linking each of the technology components with one or more of the desired business capabilities based on the associating of the plurality of desired business capabilities with the plurality of requirements and the associating of each of the plurality of technology components with one or more of the plurality of requirements.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
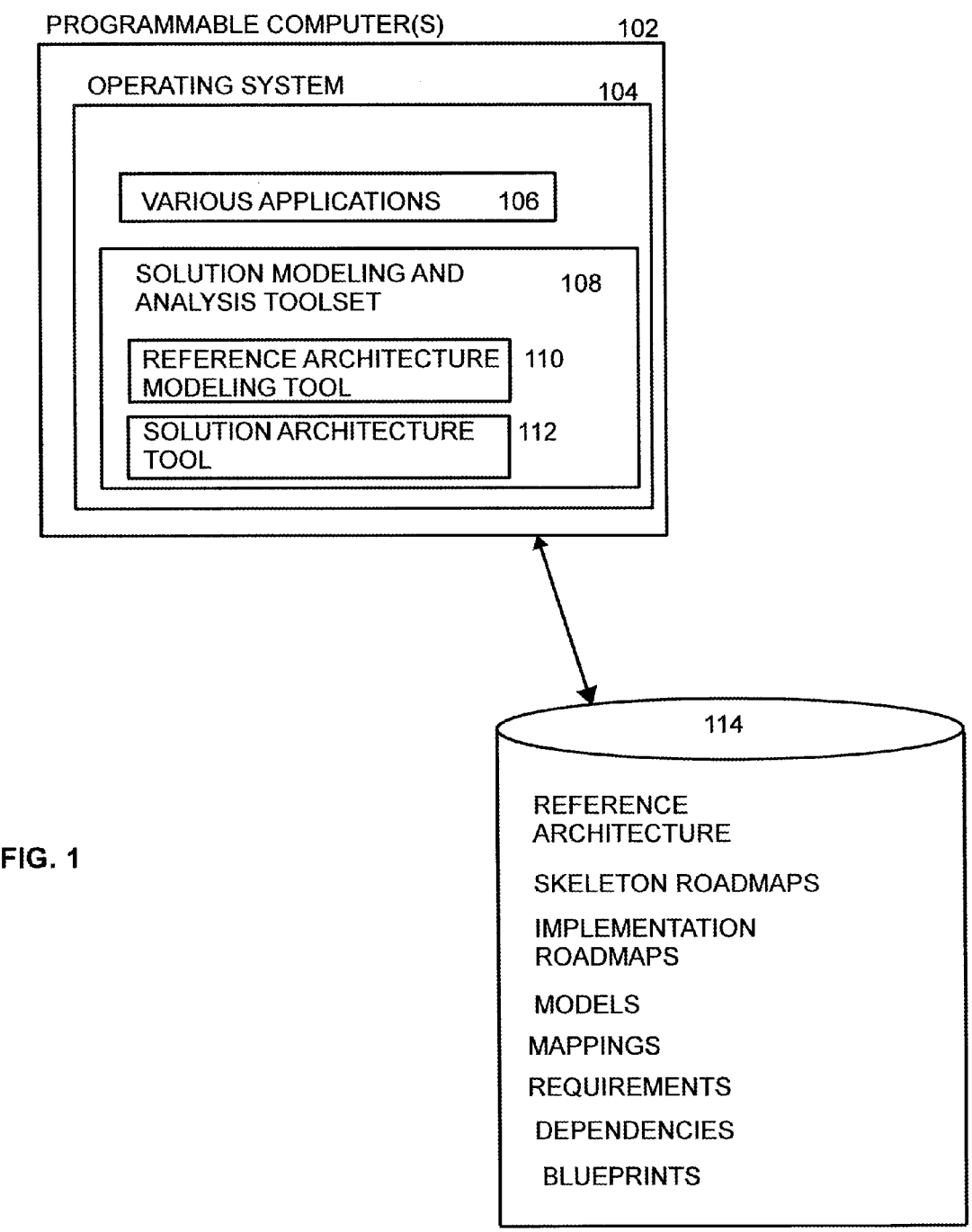
FIG. 1 illustrates an example computer environment in which a solution modeling and analysis toolset in accordance with the present disclosure can be implemented.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CORaM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In describing aspects of the present disclosure, certain terms are used in accordance with their accepted meaning to one of ordinary skill in this field of endeavor. To assist in an understanding of what is meant by certain terms, the following definitions are provided.

An "artifact" is an architectural work product that describes an aspect of an architecture. Artifacts are generally classified as catalogs (lists of things), matrices (showing relationships between things), and diagrams (pictures of things). Examples include a requirements catalog, a business interaction matrix, and a use-case diagram.

A "software requirement" is a condition or capability that must be met or possessed by a system or system component to satisfy a contract, standard, specification, or other formally imposed document. In general, a "requirement" is a statement of need that must be met by a particular architecture or work package.

In an agile development environment, a "backlog" is a way to identify the high-level features or functionality of a product that are to be implemented.

A "dependency" refers to a relationship or association between two entities and includes a 'label' and a 'direction' and, as known to one of ordinary skill, can be captured in a model in a variety of different ways. Currently, a variety of tools are available that can automatically derive dependencies between capabilities, between capabilities and sub-capabilities, between requirements, and between technologies when provided with a model or description of these entities.

"Traceability" refers to the degree to which a relationship can be established between two or more products of a development process, especially products having a predecessorsuccessor or master-subordinate relationship to one another. Traceability is used to track the relationship between each unique product-level requirement and its source. For example, a product requirement might trace from a business need, a user request, a business rule, an external interface specification, an industry standard or regulation, or some other source. Traceability is also used to track the relationship between each product-level requirement and the work products to which the requirement is allocated. For example, a single product requirement might trace one or more architectural elements, detail design elements, objects/classes, test units, documentation topics or people that implement that requirement. Forward traceability links the sources of a requirement to the requirement and to work products that implement the requirement. Backwards traceability links a work product that implements a requirement to the requirement and then to the sources for that requirement.

A "use case" is a structure for documenting the functional requirements for a system, usually involving software. Each use case provides a set of scenarios that convey how the system should interact with a human or another system to achieve a specific business goal.

A "functional requirement" explains what has to be done by the system by identifying the necessary task, action or activity that must be accomplished. A "non-functional requirement" is a requirement that specifies criteria that can be used to judge the operation of a system, rather than specific behaviors.

A "solution", or "solution architecture", or "implementation architecture" defines in detail a new information management environment. The solution architecture provides the overall technology solution for a specific implementation that includes sufficient technical details to undertake the logical and physical design, development, testing and implementation of a project.

An "architecture roadmap" or a "solution roadmap" lists individual technology components that will realize a solution architecture and lays them out in a timeline to show progression from a baseline architecture to a target architecture. A "target architecture" includes a description of a future state of the architecture being developed for an organization. There may be several future states developed as a roadmap to show the evolution of the architecture to a target state.

A "reference architecture" is a resource containing a consistent set of architecture best practices for use by all teams of an organization. It consists of information accessible to all project team members that provides a consistent set of architecture best practices. These can be embodied in many forms: prior project artifacts, company standards, design patterns, commercial frameworks, etc. The mission of the reference architecture is to provide an asset base that projects can draw from at the beginning of the project lifecycle and add to at the end of the project. It provides a common vocabulary with which to discuss implementations and can be defined at different levels of abstraction.

A definition of "enterprise" in this context is any collection of organizations that has a common set of goals and/or a single bottom line. In that sense, an enterprise can be a government agency, a whole corporation, a division of a corporation, a single department, or a chain of geographically distant organizations linked together by common ownership.

The term "enterprise" in the context of "enterprise architecture" can be used to denote both an entire enterprise, encompassing all of its information systems, and a specific domain within the enterprise. In both cases, the architecture crosses multiple systems, and multiple functional groups within the enterprise. From an organizational perspective, an enterprise architecture (EA) is a rigorous description of the structure of an enterprise, which comprises enterprise components (business entities), the externally visible properties of those components, and the relationships (e.g. the behavior) between them. This description is comprehensive, including enterprise goals, business processes, roles, organizational structures, organizational behaviors, business information, software applications and computer systems, as well as terminology used and guiding principles for changing itself (self-similar, fractal and self-referential). Thus, an "enterprise architecture" defines an enterprise-wide, integrated set of components that incorporate strategic business thinking, information assets, and technical infrastructure of an enterprise to promote information sharing across agency and organizational boundaries.

The term "architecture" has two meanings depending upon its contextual usage: a) a formal description of a system, or a detailed plan of the system at component level to guide its implementation; or b) the structure of components, their inter-relationships, and the principles and guidelines governing their design and evolution over time. Different levels of abstraction of an "architecture" include: a Business (or Business Process) Architecture—this defines the business strategy, governance, organization, and key business processes; a Data Architecture—this describes the structure of an organization's logical and physical data assets and data management resources; an Applications Architecture—this kind of architecture provides a blueprint for the individual application systems to be deployed, their interactions, and their relationships to the core business processes of the organization; and a Technology Architecture—this describes the logical software and hardware capabilities that are required to support the deployment of business, data, and application services. This includes IT infrastructure, middleware, networks, communications, processing, standards, etc.

An architecture is the use of abstractions and models to simplify and communicate complex structures and processes to improve understanding and forecasting the behavior of the system—in this case the system of innovation. Architecture uses sets of abstractions and models of an environment, problem space or domain, either physical or logical, with a set of associated views into that domain to provide:

Simplification and management of complexity in all of its forms (structural, procedural or informational), in particular the management, understanding and integration of the business and technical domains;

Communication and common understanding of the problem space to multiple stakeholders from widely different environments by the use of multiple domain specific views of the architectural model;

Completeness and relationship analysis of proposed solutions in the problem space or domain by examining the models and architectures from multiple differing viewpoints for incompleteness and gaps; and Forecasting and predicting future architectures, strategies, structures, patterns, relationships and technologies in the business and technical space by extrapolation of abstractions and models.

Abstraction, as in "level of abstraction", can mean providing a focus for analysis that is concerned with a consistent and common level of detail or abstraction. Abstraction in this sense is typically used in architecture to allow a consistent level of definition and understanding to be achieved in each area of the architecture in order to support effective communication and decision-making. It is especially useful when dealing with large and complex architectures as it allows relevant issues to be identified before further detail is attempted.

An "application" is a deployed and operational IT system that supports business functions and services; for example, a payroll. Applications use data and are supported by multiple technology components but are distinct from the technology components that support the application. While an "application architecture" refers to a description of the structure and interaction of the applications as groups of capabilities that provide key business functions and manage the data assets. An "application platform" refers to the collection of technology components of hardware and software that provide the services used to support applications.

A "building block" represents a (potentially re-usable) component of business, IT, or architectural capability that can be combined with other building blocks to deliver architectures and solutions. Building blocks can be defined at various levels of detail, depending on what stage of architecture development has been reached. For instance, at an early stage, a building block can simply consist of a name or an outline description. Later on, a building block may be decomposed into multiple supporting building blocks and may be accompanied by a full specification. Building blocks can relate to "architectures" or "solutions".

A "capability" refers to an ability that an organization, person, or system possesses. Capabilities are typically expressed in general and high-level terms and typically require a combination of organization, people, processes, and technology to achieve. For example, marketing, customer contact, or outbound telemarketing.

A "constraint" means an external factor that prevents an organization from pursuing particular approaches to meet its goals. For example, customer data is not harmonized within the organization, regionally or nationally, constraining the organization's ability to offer effective customer service.

A "model" includes a representation of a subject of interest. A model provides a smaller scale, simplified, and/or abstract representation of the subject matter. A model is constructed as a "means to an end". In the context of enterprise architecture, the subject matter is a whole or part of the enterprise and the end is the ability to construct "views" that address the concerns of particular stakeholders; i.e., their "viewpoints" in relation to the subject matter.

An "objective" is a time-bounded milestone for an organization used to demonstrate progress towards a goal; for example, "Increase Capacity Utilization by 30% by the end of 2009 to support the planned increase in market share".

A "reference model" is an abstract framework for understanding significant relationships among the entities of an environment, and for the development of consistent standards or specifications supporting that environment. A reference model is based on a small number of unifying concepts and may be used as a basis for education and explaining standards to a non-specialist. A reference model is not directly tied to any standards, technologies, or other concrete implementation details, but it does seek to provide common semantics that can be used unambiguously across and between different implementations.

According to the principles of the present disclosure, a system and method provides for modeling of a solution architecture that identifies composite services that can be used to fulfill the requirements of a business. Available composite services or composite components are analyzed to construct a capability based on a solution search that is defined by an Enterprise Architect (EA). The EA is offered architectural options to consider. In other words, a solution can be defined and then a toolset, in accordance with the principles of the present disclosure, can analyze the requirements and provide the EA with one or more options of how the solution could be built (or implemented). The options offered to the EA can take into account functional requirements, non-functional requirements, and technical constraints that are defined by the EA as part of the solution search.

Furthermore, an implementation roadmap may be offered for a solution. The implementation roadmap may specify what technologies need to be installed, in what order they need to be installed, and the associated activities that need to take place as part of each phase of the implementation roadmap. Example activities can include such things as: the scope of deployment, training required, the scope of use, and the scope of users. For each different phase of the implementation roadmap, the extent of these activities may be different.

The implementation roadmap can also identify gaps where existing technologies are not currently implemented. Thus, activities can be defined which will need to be performed in order to fulfill the implementation roadmap. These identified 'gap activities' can be prioritized in a backlog so that they can be accomplished in an orderly fashion.

In accordance with the principles of the present disclosure, methods and tools are provided that integrate a company's business domain (that seeks off-the-shelf software and hardware) with technological offerings and resulting architecture roadmaps. In this way, a top-down analysis process can include a mechanism for selecting technologies and an implementation according to business capabilities and offered expected outcomes. For example, a modeling and analysis system for architecture management, based on a Reference Architecture, connects business capability needs of technology consumers with software and hardware technologies that enable rapid and nimble construction of solutions. A bridge is provided between three domains: 1) the Business Architecture represented as a Reference Architecture (or sometimes referred to as an Innovation Architecture); 2) the requirements engineering and design of software engineering and process domain; and 3) the solution architecture domain. In general, an initial technological solution (and its underlying use cases) is automatically generated by analyzing offered and selected capabilities and their expected outcomes in order to produce a recommended Solution Architecture. The Solution Architecture can include currently implemented technology of the Enterprise, future planned technology, or a need for additional technology development.

A number of individual elements work in conjunction with one another to provide a modeling and analysis system as described above. Modeling of the Reference Architecture may be accomplished in such a way as to provide mapping of the capabilities of the Reference Architecture. For example, a Domain Specific Language (DSL) may be used in a modeling tool that defines a structured way for constructing, or modeling, 1) a capability; 2) its expected outcome; 3) dependencies between capabilities; and 4) aggregation of capabilities into conceptual functional modules.

Modeling of a lifecycle solution map is beneficial as well. For example, one solution lifecycle may entail the stages of: Model-Assemble-Change-Monitor-Optimize. Within such a model, capabilities can be aggregated into modules that can be mapped between the different stages. The described modeling environment may also include modeling of capabilities and technologies such that mapping, or linking, of Business Architecture capabilities to technological products and services can be accomplished. Mapping of capabilities to high-level requirements is beneficial as well. Such mapping provides the ability to associate each high-level business capability with a detailed list of requirements and their use cases. For those requirements that may be associated with as-yet-to-be implemented technologies, an agile backlog can be automatically generated that, optionally, can provide a prioritized list of activities to pursue.

Other beneficial results that may be achieved with the modeling and analysis toolset described above include, for example, an ability to search for and identify which technologies and products are solving which business need and required capability. Also, by mapping capabilities in the manner described above, it can be determined if all requirements are solving a business need and capability. Additional benefits include: automatic construction of an ordered architecture roadmap; detection of duplicated or similar technologies for the same capability; detecting capabilities that support many needs; and defining a skeleton architecture implementation and roadmap that supports many solutions. The skeleton architecture roadmap includes those capabilities that are a central element in many solutions.

In general, the modeling and analysis toolset described above allows for selection of technology solutions focusing on defining what capabilities and underlying technologies a business requires. Capabilities are mapped to technologies and the capabilities are modeled within a Reference Architecture. By mapping of capabilities to technologies and to high-level requirements, and to an implementation architecture and configuration, an ordered architecture roadmap may be generated and common capabilities that support many needs can be identified.

FIG. 1 illustrates an example computer environment in which a solution modeling and analysis toolset in accordance with the present disclosure can be implemented. For example one or more programmable computers 102 can be configured to provide an operating system 104 in which other software applications 106 and the present toolset 108 can execute. Although the toolset 108 can have many functional components that operate in conjunction with one another to provide its overall functionality, the toolset 108 can be thought of as having two distinct main functional components: a reference architecture modeling tool (RAMT) 110 and a solution architecture tool (SAT) 112. During operation, the toolset 108 and its functional components will identify data that can be used as input for analysis and modeling and also produce data as output that can be stored and/or used by a user. This data is depicted in FIG. 1 as data store 114 but one of ordinary skills will recognize that the data input and output from the toolset 108 can be stored in a variety of ways and can be connected to the programmable computer(s) 102 in a variety of different manners.

Figure 2A:
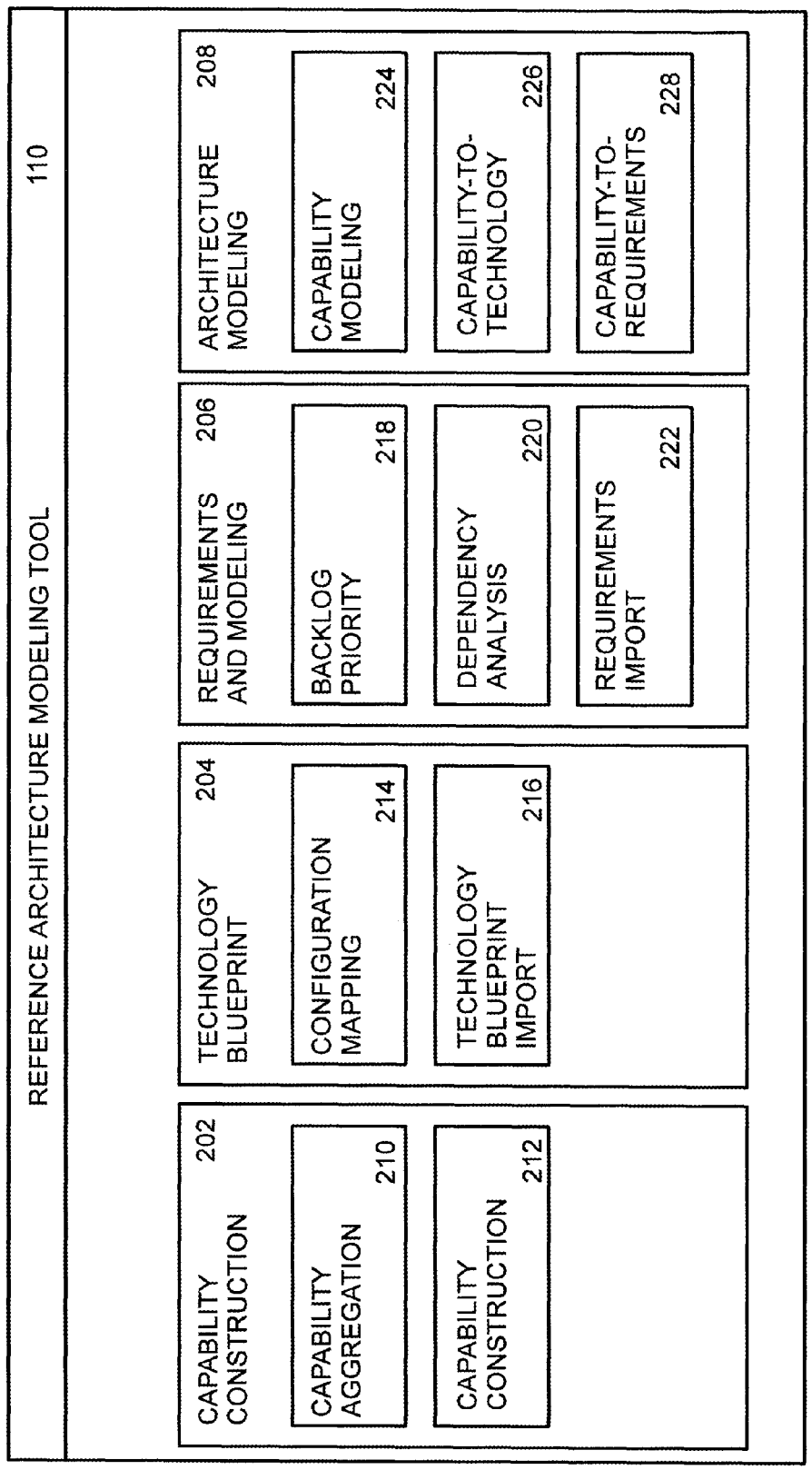
FIG. 2A depicts a high-level functional block view of a reference architecture modeling tool in accordance with the principles of the present disclosure.

FIG. 2A depicts a high-level functional block view of a reference architecture modeling tool in accordance with the principles of the present disclosure. The RAMT 110 provides for mapping of capabilities to technologies and mapping of dependencies between capabilities, sub-capabilities, and technology components. The major functional components of the RAMT 110 can be characterized as a Capability Construction Component 202, a Technology Blueprint Component 204, a Requirements and Modeling Component 206, and an Architecture Modeling Component 208.

The Capability Construction Component 202 can be characterized as providing two functions with a Capability Aggregation Component 210 and a Capability Definition Component 212. The Capability Aggregation Component 210 provides for mapping of capabilities to modules. This is accomplished by the aggregation of similar capabilities and expected outcomes into a more abstract definition of a modeled capability (e.g., a module). Similar outcomes or similar capabilities are those that belong to the same domain. For example, the capabilities of "automating system deployment" and "software provisioning" use different textual terms but are solving the same technical problem. In other words, the value of each of those capabilities and what they offer is the same regardless of what each is called. A capability might be "software provisioning" and the expected outcome would be "delivered software". Thus, both capabilities and expected outcomes can be used within the Capability Aggregation Component 210 when defining the aggregate modules. As explained in more detail below, the Capability Definition Component 212 enables construction of a rational and descriptive, searchable text of capabilities of a solution that may be identified as part of a search by a user.

The Technology Blueprint Component 204 can be characterized as providing two functions with a Configuration Mapping Component 214 and a Technology Blueprint Import Component 216. The Configuration Mapping Component 214 provides for mapping of technological dependencies of an implementation architecture and a needed configuration. An implementation architecture is a default configuration and explanation of how to install an initial technology solution. The needed configuration provides information about customizing attributes, settings and options of that initial solution. The Technology Blueprint Import Component 216 allows importing of technology blueprints. A technology blueprint includes details of dependencies, implementation architecture, implementation architecture options, and configuration parameters of technology components and their support of requirements. This information can be used by the Configuration Mapping Component 214 to perform its mapping of a needed configuration to an implementation architecture.

The Requirements and Modeling Component 206 can be characterized as providing three functions with a Backlog Priority Component 218, a Dependency Analysis Component 220, and a Requirements Import Component 222. The Requirements Import Component 222 imports requirements into the RAMT 110 to be used and analyzed by the various components of the RAMT 110. The Requirements Import Component 222 can be used in either a formal or agile environment. The Dependency Analysis Component 222 allows analysis of requirements and technologies to determine dependencies between technologies and requirements. The Backlog Priority Component 218 provides the ability to prioritize backlog development (for an agile approach) based on capability and requirements traceability, as well as technological capabilities. With this component 218, a user can define constraints that will affect prioritization of the backlog.

The Architecture Modeling Component 208 can be characterized as providing three functions with a Capability Modeling Component 224, a Capability-to-Technology Component 226, and a Capability-to-Requirements Component 228. The Capability Modeling Component 224 uses the information provided through the Capability Construction Component 202 to provide a model of capabilities. The Capability Modeling Component 224 can also utilize information from the other components 226 and 228. The Capability-to-Technology Component 226 provides mapping of technologies to capabilities. A technology blueprint can be used to suggest relevant technologies for a capability. The Capability-to-Requirements Component 228 provides mapping of capabilities to requirements. Existing requirements that are already mapped to technologies can be used to suggest relevant technologies for a capability.

Figure 2B:
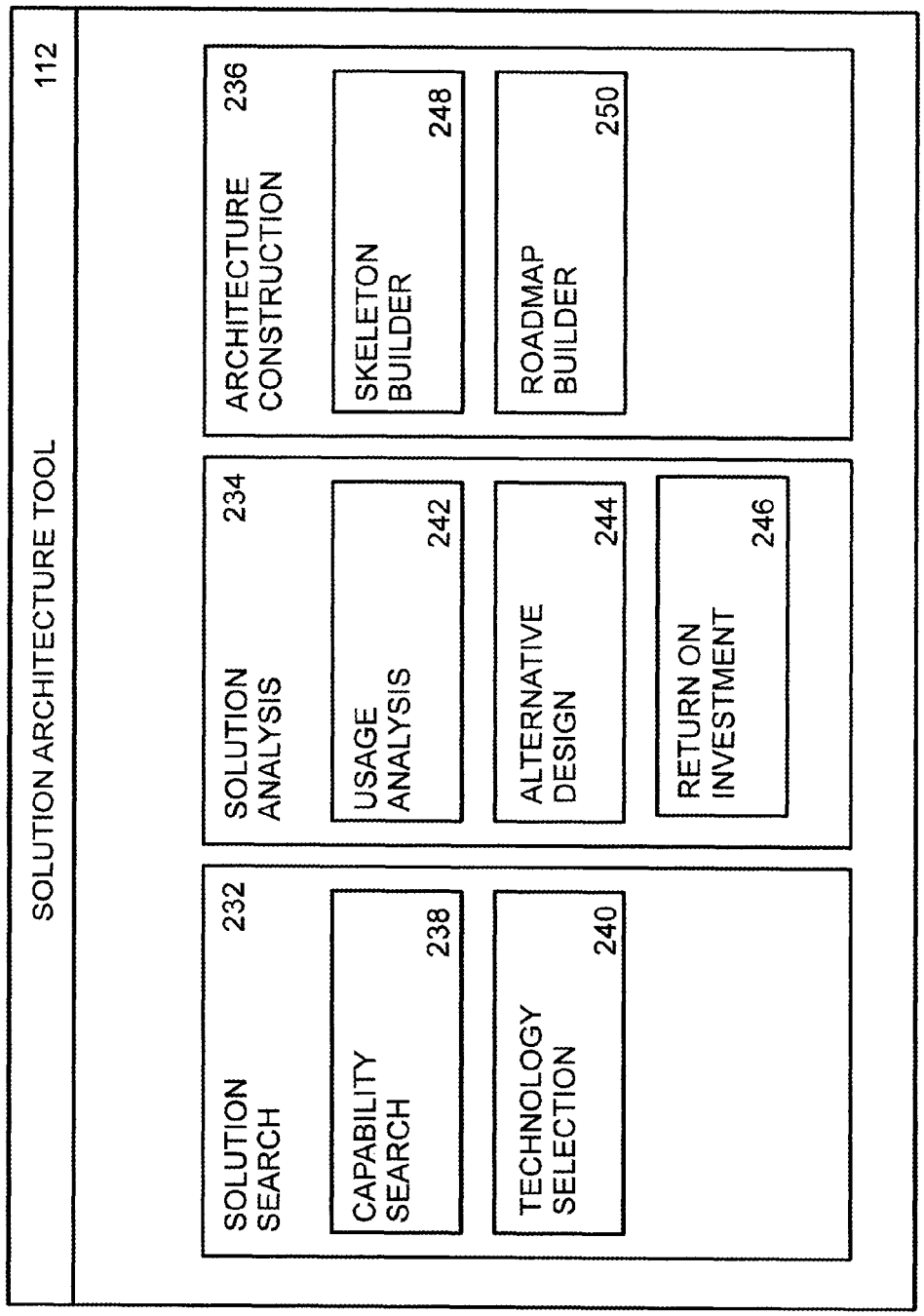
FIG. 2B depicts a high-level functional block view of a solution architecture tool in accordance with the principles of the present disclosure.

With the RAMT 110 in place, the SAT 112 can assist a user in identifying and analyzing a solution architecture. FIG. 2B depicts a high-level functional block view of a solution architecture tool in accordance with the principles of the present disclosure. The SAT 112 provides for searching of technologies with one possible goal of generating a solution roadmap. The major functional components of the SAT 112 can be characterized as a Solution Search Component 232, a Solution Analysis Component 234 and an Architecture Construction Component 236.

The Solution Search Component 232 can be characterized as providing two functions with a Capability Search Component 238 and a Technology Selection Component 240. The Capability Search Component 238 allows a user to enter search criteria to identify pertinent capabilities within a Business Architecture. In practice, the information in the Capability Aggregation Component 210 can comprise the corpus of a user's search. The Technology Selection Component 240 can then use the information returned by the search and the Capability-to-Technology Component 226 to identify technology that corresponds to the user's search. The user may be returned with many technology options on the basis that multiple technologies may deliver solutions that support the same capability.

The Solution Analysis Component 234 can be characterized as providing three functions with a Usage Analysis Component 242, an Alternative Design Component 244, and a Return-on-Investment (ROI) Component 246. The Usage Analysis Component 242 can detect duplicated or similar technologies for the same capability. The analysis provided by this component 242 can be used to identify similar or redundant implementations and to detect "cardinal" capability that supports many needs. Based on actual used (or implemented) solutions and identified capabilities, this component 242 can determine which capabilities employ more than others. These "cardinal" capabilities can be identified as areas for increased investment. This component 242 can also analyze a requested capability to determine if it is not being used and consider possible solutions that would increase its usage.

The Alternative Design Component 244 can present a user with alternative solution options and using the Usage Analysis Component 242 can rank the solution options by a variety of characteristics such as, for example, which solution option is currently the most commonly used solution. The ROI Component 246 identifies tangible benefits or a measurable value that may be achieved by implementing a selected solution option.

The Architecture Construction Component 236 can be characterized as providing two functions with a Skeleton Builder Component 248 and a Roadmap Builder Component 250. The Roadmap Builder Component 250 uses the capabilities selected to determine a solution roadmap. Construction of the ordered architecture roadmap can be prioritized based on requirements, analysis of the capabilities dependencies, and technology dependencies. The Skeleton Builder Component 248 identifies a subset of the architecture roadmap. Based on the roadmap from the Roadmap Builder Component 250 and the selected capabilities, this component 248 can provide its own architecture implementation and roadmap to support many other solutions that also support the selected capabilities. The Skeleton Roadmap Builder Component 250 detects one or more essential capabilities and, therein, determines a skeleton technology architecture for providing those capabilities. While this skeleton technology architecture supports the solution from the Roadmap Builder Component 250, the skeleton technology architecture can then be used as a foundation for other, possible more mature, solutions.

Portions of the operational usage of the Solution Modeling and Analysis Toolset 108, as described above, can be explained with two different example use cases. In one use case, a software architect can expand a model of the Enterprise Architecture. In particular, the Software architect can construct a list of capabilities using the Architecture Modeling Component 208. Using the Capability-to-Technology Component 226, the list of capabilities can be linked with existing technologies or future/desired technologies. Thus, the capabilities available in the modeling environment can be expanded to include additional existing capabilities and proposed capabilities. As the resulting dependencies between capabilities, technologies and requirements are generated, these dependencies are organized into a searchable model.

Another example use case can include using the reference architecture for constructing a solution for a particular business. A user can select capabilities that are described in business terms according to a particular domain, pertinent keywords, or free-form text. The Solution Modeling and Analysis Toolset 108 can then identify a list of underlying technologies linked with the selected capabilities. Based on the searched capabilities, the returned list can not only include details about the underlying technologies but also derived capabilities that are provided by those technologies but not necessarily included in the search. The technologies can be arranged as an architecture roadmap in order to provide an ordered sequence of when certain capabilities can be supported and what capabilities can be supported next.

To assist in the understanding of the above described toolset, some examples of capabilities and technologies are provided. Within the domain of "Security" there may be two sub-domains of "Identity Management" and "Access Management". Within the sub-domain of "Identity Management" one capability might include "Directory Services" and an example technology that supports this capability could include Microsoft Active Directory. Within the sub-domain of "Access Management" there may be three capabilities such as "Strong Authentication", "Access Control" and "Network Access Control". These capabilities could be supported, respectively, by the following technologies: ActivPak, SiteMinder SSO, and Cisco ACS.

Other examples include the capability of "Incident Management" which is, for example, supported by the technology component "Remedy Service Desk". Other example capabilities can include Authentication, Monitoring, Business Intelligence, Service Insight, Automation, Fault Management, Operations Insight, Infrastructure Monitoring, Infrastructure Configuration, and Performance Management. One of ordinary skill will recognize that a variety of other capabilities can be identified and defined within an Enterprise Architecture.

Models of two example capability modules, constructed as described above, are provided to illustrate the type and detail of information extracted and arranged by the solution modeling and analysis toolset in accordance with the principles of the present disclosure. The described capability model, or capability module model, aggregates capabilities that share similar expected outcomes and use cases, links to requirements or required activities over various lifecycle stages, and links to technology that supports those required activities that fulfill the particular capability. Accordingly, this model allows traceability between requirements and capabilities, between technology and capabilities, between requirements and technology; and allows such traceability over the various lifecycle stages. This model can capture the relationship that the capabilities are fulfilled when the requirements, or required acts, are supported when the technology is implemented. The reverse relationships are captured as well and can be searched for and analyzed using the toolset and models described herein.

One capability module is a "Fault and Configuration Management" module. A textual description can indicate that this capability module pertains to a) modeling an infrastructure or network device, manually or automatically; b) configuring sampling profiles of the network health; and c) alerting to the problem management systems when requested health/state changes.

In the example, a Model-Assemble-Automate-Assure-Secure-Manage lifecycle can be assumed, the following requirements, or required activities, descriptions can be included in the module model for each lifecycle stage (example required activities for the "Manage" stage are omitted for brevity).

Model: define and model device models; identify Management Information Base (MIB); define infrastructure polling policies; define alert and event configuration rules; define configuration and monitoring policies.

Assemble: reconfigure existing device models; import MIB to database; configure polling policy; configure alert and configuration rules; implement device configuration and monitoring policies.

Automate: discover and map infrastructure and network devices; re-evaluate existing devices against reconfigured models.

Assure: visualize infrastructure and relationship between entities; visualize traffic between infrastructure endpoints; monitor and capture network device faults and traps; correlate events to suppress unnecessary alarms; correlate events and alerts to pinpoint root cause; compare configuration history and changes.

Secure: authenticate users; authorize users; allow users access to entitled data.

Included in this capability model is a mapping, linking or identification of technology, or technology components, that enables or supports that particular capability. In this example, possible technologies include "Spectrum IM" and "CA Business Intelligence" and an indicator can be included that identifies whether this technology is currently implemented, is available, or has yet to be developed. Relevant use-cases that can be associated with this capability model include: self-certify network devices; discover devices; poll devices; process events; configure devices; fault and configuration reporting.

Another example capability module is a "Performance Management" module. A textual description can indicate that this capability module pertains to a) defining and harvesting performance data from the network; and b) producing schedule reports and alerts to indicate performance-related health/state changes.

In the example, Model-Assemble-Automate-Assure-Secure lifecycle, the following capability descriptions can be included in the model.

Model: define and model performance data and collection profiles; define and model performance data collection schedules; define performance related alert and event configuration rules.

Assemble: configure performance data collection profiles; configure performance data collection schedules; configure performance related alert and event configuration rules.

Automate: assign performance and data collection profiles to infrastructure and network devices; assign performance data collection schedules to infrastructure and network devices.

Assure: capture and store performance data; visualize performance data for infrastructure and network devices; schedule and produce performance data reports; monitor and capture performance related alerts and events; send notifications to problem management systems for specified performance alerts and events.

Secure: authenticate users; authorize users; allow users access to entitled data and reports.

Included in this capability model is a mapping, linking or identification of technology that enables or supports this capability. In this example, possible technologies include "eHealth", "NetQoS Report Analyzer", "NetQoS Performance Center", and "Site Minder Single Sign On WWSI Adapter". Relevant use-cases that can be associated with this capability model include: fast poll devices, capture and store performance data, visualize performance, performance management reporting, alert notification, event notification. Thus, the module model includes linking, or mapping, between requirements and capabilities and linking, or mapping, between capabilities and technologies along with information about relevant use-cases. This information within the model can be entered by a user using the toolset and can also be automatically extracted from architectures, blueprints, requirements lists, and other artifacts like this within the Enterprise Architecture.

Figure 3A:
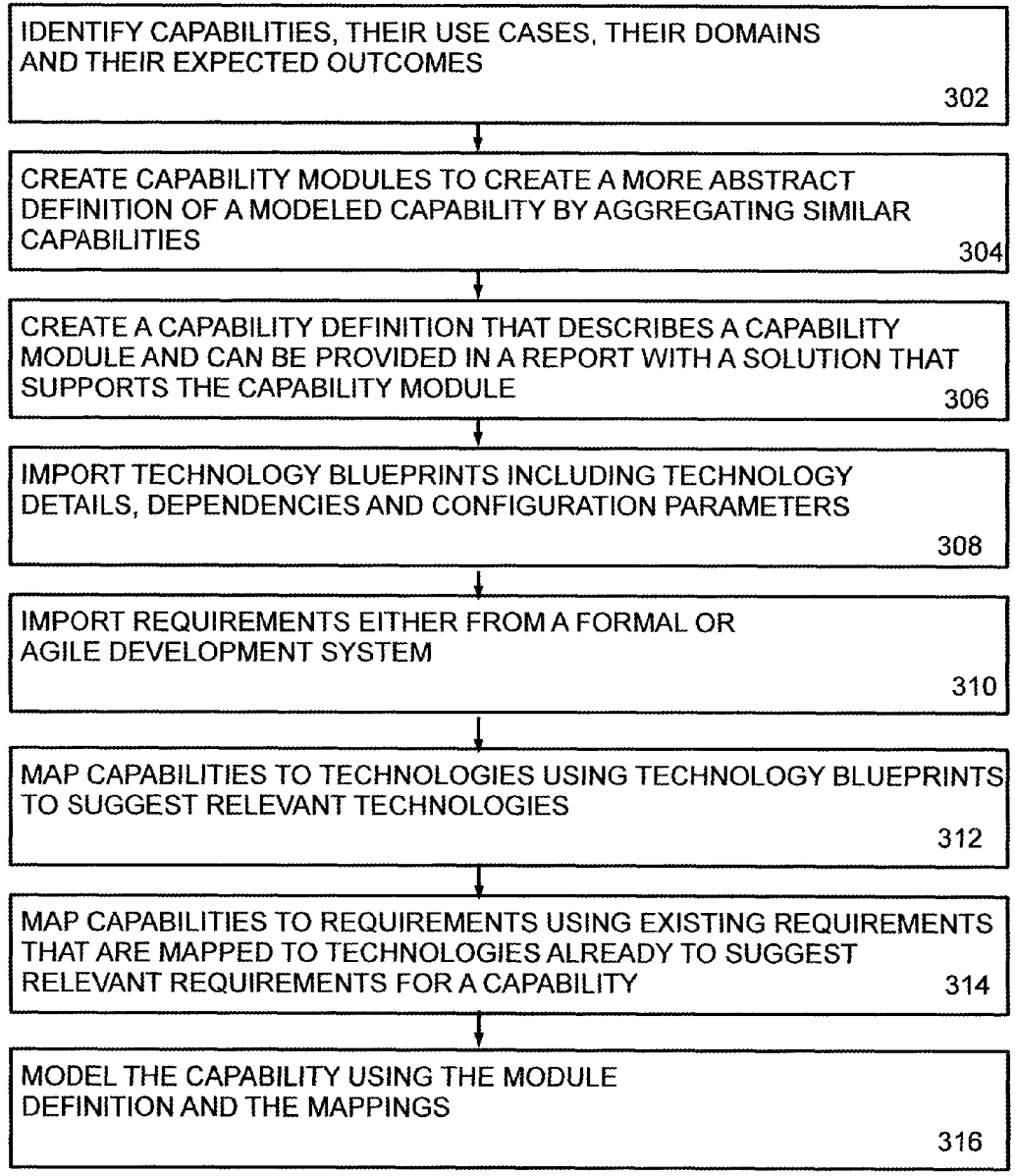
FIG. 3A depicts a flowchart of an example process for modeling a reference architecture in accordance with the principles of the present disclosure.

FIG. 3A depicts a flowchart of an example process for modeling a reference architecture in accordance with the principles of the present disclosure. In step 302 a user can use the present toolset to identify or define capabilities, their use cases, their domains and their expected outcomes. These capabilities and their characteristics can be selected from a reference architecture which provides a common nomenclature and definitions to facilitate the process. In step 304, the individual capabilities can be combined into capability modules wherein a capability module aggregates similar capabilities. Similarity can be based on a common domain, a common expected outcome, or the like. This aggregation can occur automatically by the toolset or can involve interaction with the user to guide or modify the automatic aggregation. Ultimately, in step 306, a capability definition for a capability or a capability module can be generated that describes that capability or module. When a user searches for and receives a technical solution that supports this capability or module, the definition can be included in a report related to that technical solution.

In modeling the reference architecture, various technology blueprints and requirements lists can be imported in step 308 and 310, respectively. The user can then use the toolset, in step 312, to map capabilities to technologies that support those capabilities. Part or all of this mapping of capabilities to technologies can be performed automatically such as by using the imported technology blueprints to derive such mappings. In step 314, the user can use the toolset to map capabilities to requirements. Such mapping can also occur automatically by analyzing the current reference architecture model to determine which capabilities similar requirements are already mapped to. The technology blueprints and any technology information input by a user can include an indication about whether a technology is currently implemented with existing technology, currently implemented but with technology not present in the enterprise architecture, or technology that has yet to be developed.

In step 316, then, a model of the capabilities of reference architecture can be constructed that includes capabilities, technologies, requirements, or required activities, and mappings there between. In this way, traceability is inherent in the model such that bi-directional traceability is provided between capabilities and requirements, requirements and technologies, and technologies and capabilities.

The information in the technology blueprints and the requirements lists allows the toolset to derive dependencies between technologies and requirements. Thus, the backlog of requirements to be implemented can be prioritized, if desired, based on which requirements a user wishes to fulfill first or based on which requirements must be fulfilled first to allow subsequent requirements to be fulfilled. Identification of the requirements and their dependencies allow derivation of what capabilities are involved and their dependencies. Accordingly, based on the capabilities information, the toolset can derive technologies and technology dependencies. A business's priorities for deployment of capabilities can be input to the toolset to help determine the backlog for implementation. The derived technology blueprint identifies dependencies between technology components and factors this into the backlog and, also, into the implementation roadmap.

Figure 3B:
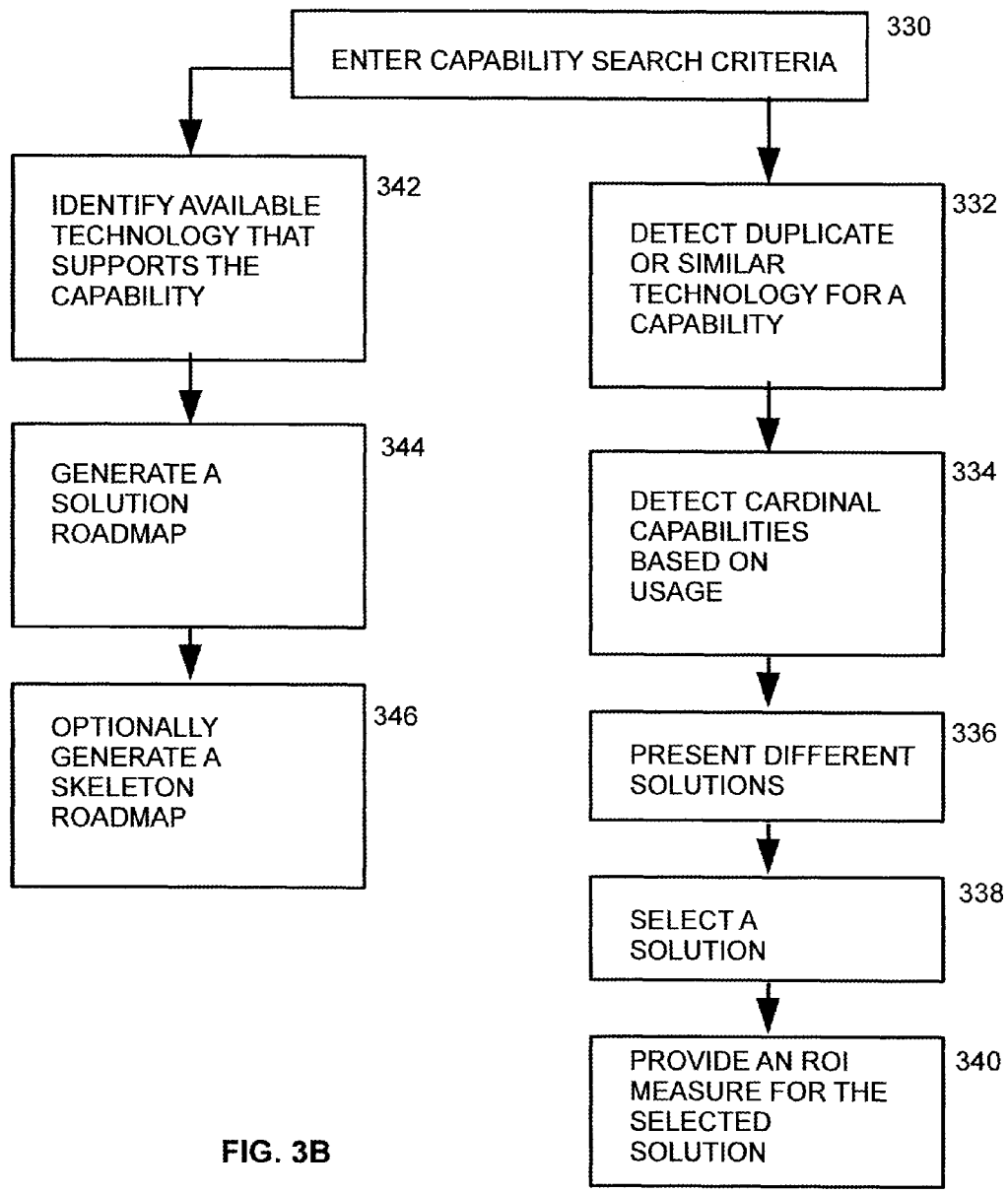
FIG. 3B depicts a flowchart of an example process for capability searching a reference architecture model in accordance with the principles of the present disclosure.

FIG. 3B depicts a flowchart of an example process for capability searching a reference architecture model in accordance with the principles of the present disclosure. In step 330, a user can use the present toolset to identify one or more capabilities of interest to search for. The search query can involve capability labels, capability descriptions, use cases, etc. Two different process paths are shown in FIG. 3B; however, these process paths do not necessarily have to be performed in the order shown nor be performed in parallel as shown. The individual steps depicted can be performed differently than that explicitly shown in FIG. 3B.

In step 332, the toolset can analyze the reference architecture model and determine duplicate or similar technologies that support the capabilities in the search query. The mappings between technologies and capabilities within the model allow this determination to take place automatically. For example, for a specific selected capability, the toolset can determine if redundant technology is present or expected within the reference architecture model. Of the identified redundant technologies, the toolset can, in step 334, identify "cardinal" capabilities based on actually used or implemented technologies. Based on what technologies are currently being used, the toolset can, in step 336, present different technology solutions for supporting a capability and even suggest a solution based on the usage data from step 334. When a user selects one of the presented solutions, in step 338, the toolset can provide an ROI measure for that selected solution, in step 340.

In essence, the implementation, or solution, roadmap will determine what capabilities will be delivered and when they will be delivered. As one example, a phase of an implementation may deliver a subset of a capability (e.g., a subset of functional use cases associated with a capability) so that a user will achieve a specific set of capability-driven "value" or "return on investment". This "return on investment" could be considered as tied to underlying technology components but in the toolset, the ROI is specific to a capability or capabilities within a solution.

Another outcome of searching for capabilities can be the creation of a solution roadmap. In step 342, the toolset identifies to a user the available technology that supports the capability or capabilities searched for. Based on the capabilities from step 330, the toolset can determine, from the model, requirements associated with these capabilities and technologies that support these requirements. The available technologies represent one or more solutions for supporting that capability, with each solution including at least a subset of the identified technologies. For a particular solution (i.e., a subset of available technologies identified in step 342), the reference architecture model includes information about technologies, requirements, capabilities, technology dependencies, requirements dependencies and can, thus, produce a solution roadmap that provides an ordered architecture roadmap for implementing the technologies identified in the solution. A user can use the toolset to prioritize requirements or prioritize capabilities based on a variety of criteria (e.g., maximize utilization of already implemented technology) to modify the solution roadmap that is constructed in step 344.

Optionally, in step 346, a skeleton roadmap and/or skeleton architecture can be constructed as well. Of the many possible solutions that can support the searched-for capabilities, there may be technologies that are essential or critical to these solutions. Essential technologies may include technologies that are in all the different solutions, or technologies that are in a majority of the possible solutions, or even technologies that are in more than one of the possible solution. Regardless of how these essential technologies are defined, they can be identified and used to construct the skeleton roadmap or skeleton architecture which can then be output to the user.

Figure 4:
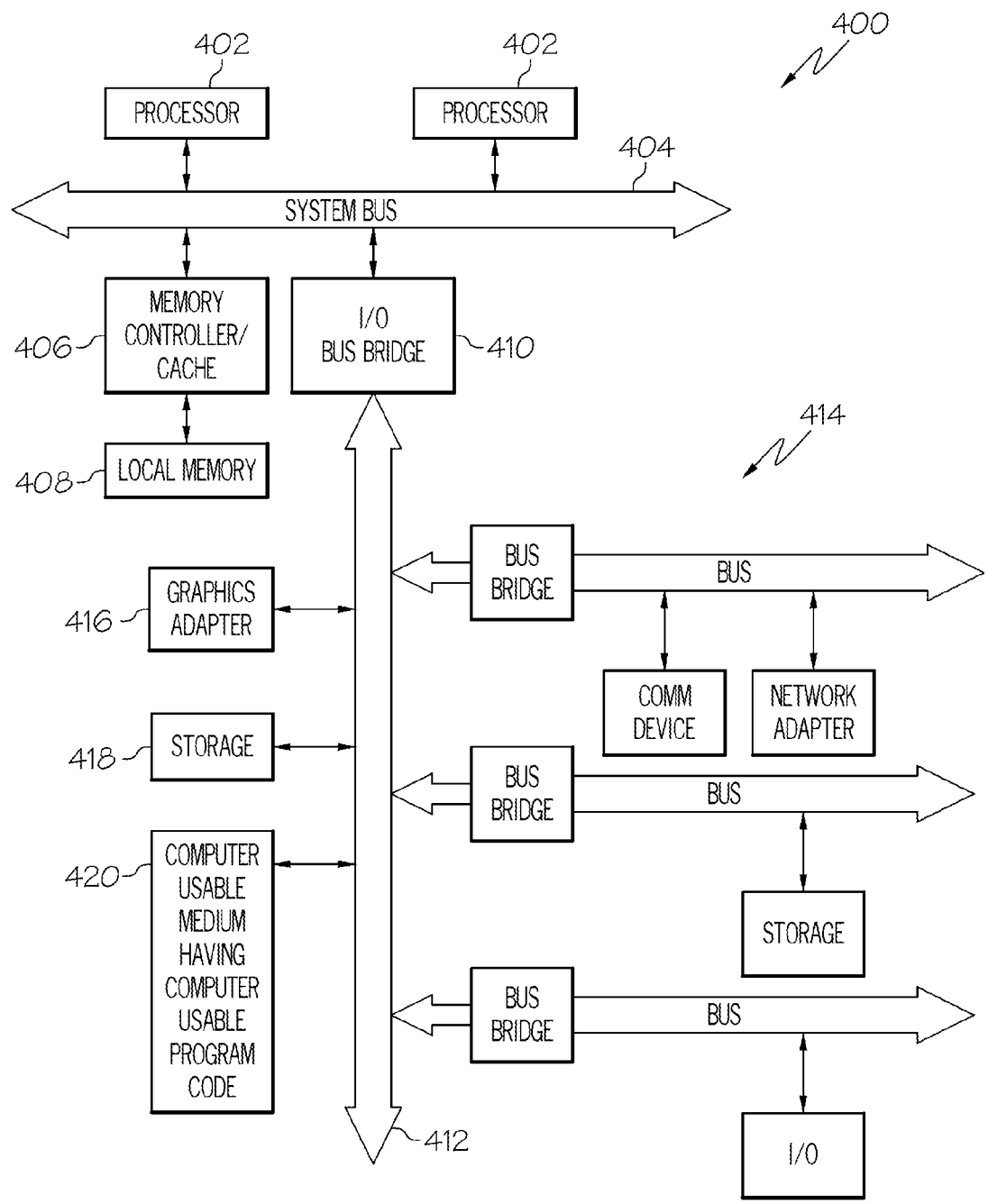
FIG. 4 is a block diagram of a data processing system in accordance with the principles of the present disclosure.

Referring to FIG. 4, a block diagram of a data processing system is depicted in accordance with the present disclosure. A data processing system 400, such as may be utilized to implement the hardware platform 108 or aspects thereof, e.g., as set out in greater detail in FIG. 1-FIG. 3B, may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 412. The I/O bus may be utilized to support one or more busses and corresponding devices 414, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 416, storage 418 and a computer usable storage medium 420 having computer usable program code embodied thereon. The computer usable program code may be executed to execute any aspect of the present disclosure, for example, to implement aspect of any of the methods, computer program products and/or system components illustrated in FIG. 1-FIG. 3B.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method for modeling an enterprise architecture, comprising:
    associating, by the computer, a plurality of desired business capabilities with a plurality of requirements;
    associating, by the computer, each of a plurality of technology components with one or more of the plurality of requirements, based on a respective technology component supporting the one or more requirements; and
    based on the associating of the plurality of desired business capabilities with the plurality of requirements and the associating of each of the plurality of technology components with one or more of the plurality of requirements, constructing, by the computer, a model of the enterprise architecture, said constructing comprising linking each of the technology components with one or more of the desired business capabilities;
    identifying a particular one of the technology components that is not yet implemented; and
    identifying which of the plurality of desired business capabilities is linked with the particular one technology component.

2. The method of claim 1, further comprising:
    constructing, by the computer, a plurality of capability modules, wherein each capability module is associated with a respective subset of the plurality of desired business capabilities.

3. The method of claim 2, wherein the respective subset comprises a plurality of related capabilities.

4. The method of claim 2, wherein the respective subset comprises a subset of the plurality of capabilities that produce related outcomes.

5. The method of claim 1, comprising:
    identifying, by the computer, a dependency between one of the plurality of capabilities and another of the plurality of capabilities.

6. The method of claim 1, wherein the enterprise architecture comprises a reference architecture.

7. The method of claim 1, wherein each of the plurality of technology components comprises an indication of whether or not it is presently implemented.

8. The method of claim 1, wherein each of the plurality of technology components is one of a hardware device, a software application, and a service.

9. A system for modeling an enterprise architecture, comprising:
    a processor and a memory coupled to the processor, the memory configured to store program code executable by the processor;
    the program code configured, when executed by the processor, to associate a plurality of desired business capabilities with a plurality of requirements;
    the program code configured, when executed by the processor, to associate each of a plurality of technology components with one or more of the plurality of requirements, based on a respective technology component supporting the one or more requirements; and
    the program code configured, when executed by the processor, to construct a model of the enterprise architecture, said constructing comprising linking each of the technology components with one or more of the desired business capabilities based on the associating of the plurality of desired business capabilities with the plurality of requirements and the associating of each of the plurality of technology components with one or more of the plurality of requirements;
    wherein the program code is further configured, when executed by the processor, to identify a particular one of the technology components that is not yet implemented; and wherein the program code is further configured, when executed by the processor, to identify which of the plurality of desired business capabilities is linked with the particular one technology component.

10. The system of claim 9, wherein the program code is further configured, when executed by the processor, to construct a plurality of capability modules, wherein each capability module is associated with a respective subset of the plurality of desired business capabilities.

11. The system of claim 10, wherein the respective subset comprises a plurality of related capabilities.

12. The system of claim 10, wherein the respective subset comprises a subset of the plurality of capabilities that produce related outcomes.

13. The system of claim 9, wherein the program code is further configured, when executed by the processor, to identify a dependency between one of the plurality of capabilities and another of the plurality of capabilities.

14. The system of claim 9, wherein the enterprise architecture comprises a reference architecture.

15. The system of claim 9, wherein each of the plurality of technology components comprises an indication of whether or not it is presently implemented.

16. The system of claim 9, wherein each of the plurality of technology components is one of a hardware device, a software application, and a service.

17. A computer program product for modeling an enterprise architecture, comprising:
    a non-transitory computer readable storage medium having computer readable program code embodied therewith, the computer readable program code comprising:
        computer readable program code configured to associate a plurality of desired business capabilities with a plurality of requirements;
        computer readable program code configured to associate each of a plurality of technology components with one or more of the plurality of requirements, based on a respective technology component supporting the one or more requirements; and computer readable program code configured to construct a model of the enterprise architecture, said constructing comprising linking each of the technology components with one or more of the desired business capabilities based on the associating of the plurality of desired business capabilities with the plurality of requirements and the associating of each of the plurality of technology components with one or more of the plurality of requirements;

computer readable program code configured to identify a particular one of the technology components that is not yet implemented; and computer readable program code configured to identify which of the plurality of desired business capabilities is linked with the particular one technology component.

18. The computer program product of claim 17, comprising:

computer readable program code configured to construct a plurality of capability modules, wherein each capability module is associated with a respective subset of the plurality of desired business capabilities.

19. The computer program product of claim 18, wherein the respective subset comprises a plurality of related capabilities.

20. The computer program product of claim 18, wherein the respective subset comprises a subset of the plurality of capabilities that produce related outcomes.

21. The computer program product of claim 17, comprising:

computer readable program code configured to identify a dependency between one of the plurality of capabilities and another of the plurality of capabilities.

22. The computer program product of claim 17, wherein the enterprise architecture comprises a reference architecture.

23. The computer program product of claim 17, wherein each of the plurality of technology components comprises an indication of whether or not it is presently implemented.

24. The computer program product of claim 17, wherein each of the plurality of technology components is one of a hardware device, a software application, and a service.

* * * * *